United States Patent
Minich et al.

(10) Patent No.: US 6,752,009 B2
(45) Date of Patent: Jun. 22, 2004

(54) ENCODED CRANK POSITION SENSOR

(75) Inventors: Timothy L. Minich, South Lyon, MI (US); David Stewart Mathews, Howell, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/921,438

(22) Filed: Aug. 3, 2001

(65) Prior Publication Data

US 2003/0037607 A1 Feb. 27, 2003

(51) Int. Cl.[7] .............................................. G01M 15/00
(52) U.S. Cl. ..................................... 73/117.3; 73/117.3
(58) Field of Search ........................... 73/117.3, 118.1, 73/117.2, 116, 119 A, 49.7, 1.37; 123/643, 90.15, 80, 184, 46, 190.2, 193.6, 295, 279, 352, 403, 436, 579, 580, 583, 660, 406.5, 480; 324/207.12; 701/111, 101, 102, 110, 115

(56) References Cited

U.S. PATENT DOCUMENTS

| | | | | |
|---|---|---|---|---|
| 3,682,152 A | * | 8/1972 | Muller-Berner | 123/140 |
| 4,592,318 A | * | 6/1986 | Pouring | 123/295 |
| 5,361,629 A | * | 11/1994 | McCombie | 73/117.3 |
| 5,794,171 A | * | 8/1998 | Bryant et al. | 701/99 |
| 6,474,278 B1 | * | 11/2002 | Davis et al. | 123/90.15 |

* cited by examiner

Primary Examiner—Eric S. McCall
Assistant Examiner—Monica D. Harrison
(74) Attorney, Agent, or Firm—Christopher DeVries

(57) ABSTRACT

A target wheel for providing timing information for a crankshaft in an internal combustion engine, the target wheel comprising a substantially circular member having a plurality of teeth, the teeth having variable widths, and the teeth having rising edges distributed in a non-uniform fashion and falling edges distributed in a uniform fashion, where the target wheel provides speed and timing information for multiple internal combustion engine configurations.

19 Claims, 4 Drawing Sheets

| Index | Pattern | CKP Tooth | Index | Pattern | CKP Tooth | Index | Pattern | Ckp Tooth |
|---|---|---|---|---|---|---|---|---|
| 0 | 000000 | 3 | 16 | 010000 | 1 | 32 | 100000 | 2 |
| 1 | 000001 | 4 | 17 | 010001 | 50 | 33 | 100001 | 16 |
| 2 | 000010 | 17 | 18 | 010010 | 54 | 34 | 100010 | 51 |
| 3 | 000011 | 5 | 19 | 010011 | 11 | 35 | 100011 | 25 |
| 4 | 000100 | 52 | 20 | 010100 | 57 | 36 | 100100 | 48 |
| 5 | 000101 | 18 | 21 | 010101 | xx | 37 | 100101 | 55 |
| 6 | 000110 | 6 | 22 | 010110 | 44 | 38 | 100110 | 12 |
| 7 | 000111 | 26 | 23 | 010111 | 20 | 39 | 100111 | 33 |
| 8 | 001000 | 49 | 24 | 011000 | 14 | 40 | 101000 | 58 |
| 9 | 001001 | 53 | 25 | 011001 | 46 | 41 | 101001 | 10 |
| 10 | 001010 | 56 | 26 | 011010 | 8 | 42 | 101010 | xx |
| 11 | 001011 | 19 | 27 | 011011 | xx | 43 | 101011 | 43 |
| 12 | 001100 | 13 | 28 | 011100 | 22 | 44 | 101100 | 45 |
| 13 | 001101 | 7 | 29 | 011101 | 35 | 45 | 101101 | xx |
| 14 | 001110 | 34 | 30 | 011110 | 39 | 46 | 101110 | 21 |
| 15 | 001111 | 27 | 31 | 011111 | 28 | 47 | 101111 | 38 |
| | | | | | | 48 | 110000 | 15 |
| | | | | | | 49 | 110001 | 24 |
| | | | | | | 50 | 110010 | 47 |
| | | | | | | 51 | 110011 | 32 |
| | | | | | | 52 | 110100 | 9 |
| | | | | | | 53 | 110101 | 42 |
| | | | | | | 54 | 110110 | xx |
| | | | | | | 55 | 110111 | 37 |
| | | | | | | 56 | 111000 | 23 |
| | | | | | | 57 | 111001 | 31 |
| | | | | | | 58 | 111010 | 41 |
| | | | | | | 59 | 111011 | 36 |
| | | | | | | 60 | 111100 | 30 |
| | | | | | | 61 | 111101 | 40 |
| | | | | | | 62 | 111110 | 29 |
| | | | | | | 63 | 111111 | xx |

Note: "xx" indicates invalid state.

US 6,752,009 B2

ENCODED CRANK POSITION SENSOR

TECHNICAL FIELD

The present invention relates to the control of an internal combustion engine. More specifically, the present invention relates to an encoded crank system that may be integrated seamlessly with multiple internal combustion engines having a plurality of cylinder configurations.

BACKGROUND OF THE INVENTION

Integration of vehicle parts, electronic components, and software into automotive vehicles is becoming increasingly important in today's automotive industry. Traditional methods of vehicle assembly for vehicle parts and components are giving way to flexible modular design and manufacturing techniques.

Presently, automotive companies manufacture a wide range of internal combustion engine (ICE) configurations such as in-line four-cylinder engines, in-line five-cylinder engines, in-line six-cylinder engines, and V-six and eight engines. As is known in the art of four-cycle ICEs, position and timing information for a crankshaft and a camshaft is very important for the application and synchronization of spark and fuel. The faster the engine synchronization of spark and fuel, the smoother the engine start and the better the emission control.

Present ICEs are generally configured in an overhead valve (OHV) configuration where the valves are actuated via pushrods, or in an overhead cam configuration (OHC) where the valves are acted on directly by the camshaft. The camshaft is driven by the crankshaft through a 1:2 reduction (i.e., two rotations of the crankshaft equal one rotation of the camshaft), and the camshaft speed is one-half that of the crankshaft. The crankshaft and camshaft position, for engine control purposes, are measured at a small number of fixed points, and the number of such measurements may be determined by the number of cylinders in the ICE.

In today's engine control systems, crankshaft speed is supplied by a crankshaft sensor to provide position, timing and/or speed information to an electronic controller for controlling the application of spark and fuel to the cylinders of an ICE. The crankshaft position sensor typically includes a variable reluctance or Hall effect sensor positioned to sense the passage of a tooth, tab and/or slot on a target or data wheel coupled to the crankshaft.

The target wheel or data wheel used in present crankshaft position systems generally includes a regular distribution of teeth, tabs and/or slots with substantially similar dimensions. In a four cycle ICE, the electronic controller must differentiate the intake, compression, power, and exhaust strokes since the cylinders will be at the top dead center (TDC) position during the compression and exhaust phases and at the bottom dead center (BDC) position during the intake and power phases. Accordingly, the application of fuel and spark in a typical ICE will not be applied until enough position information has been obtained from the crank or cam sensing systems. Thus, the engine controller must not only determine the TDC and BDC positions of the cylinder but also the state of the engine cycle to control fuel and spark.

Target or data wheels for a crankshaft that provide crankshaft position are traditionally designed to be specific for each engine configuration. These present systems have the disadvantages of requiring different hardware and software for each engine configuration. It would be advantageous for an automotive company to utilize a single type of generic crankshaft sensing system with a single generic target wheel and calibratible software that can be used on a plurality of engine configurations.

SUMMARY OF THE INVENTION

The present invention comprises a new crankshaft sensing system common to four cycle internal combustion engines (ICEs), including but not limited to three, four, five, six, eight, ten and twelve cylinder engines.

The crankshaft system, specifically the sensor and target wheel, provide an output signal with "events" at a fixed location relative to top dead center (TDC) compression for cylinders of the engine configurations listed above. This is achieved with the minimum number of sensing features possible to reduce the cost, complexity, and control system throughput of the crankshaft sensing system, while maximizing functionality and providing quick engine synchronization.

The present invention utilizes an encoded 58x target wheel having multi-dimensional teeth for engine timing functions that is compatible with existing control systems utilizing non-encoded 58x target wheels having uniform tooth dimensions. The term "58x" denotes that the target wheel includes 58 teeth and a synchronization area, and the term "encoded" denotes forming the teeth of a target wheel with irregular dimensions to generate a unique pulse train. For example, the pulse train will comprise a series of pulses having varying widths corresponding to time and tooth width on the target wheel. The benefits of the encoded 58x target wheel of the present invention include compatibility with engine control systems which utilize (the current 58x) non-encoded target wheels and the ability to synchronize the crankshaft within 36 degrees of rotation. The quicker the synchronization of the crank, the smoother the start of the engine with a concomitant reduction in emissions.

Another benefit of the invention is the quicker ability to recognize that synchronization of the engine has been lost in the case of noise affecting the crankshaft sensor. The quicker the recognition that synchronization has been lost, the quicker corrective action can be taken for subsystems that depend on a high degree of accuracy in crankshaft position.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
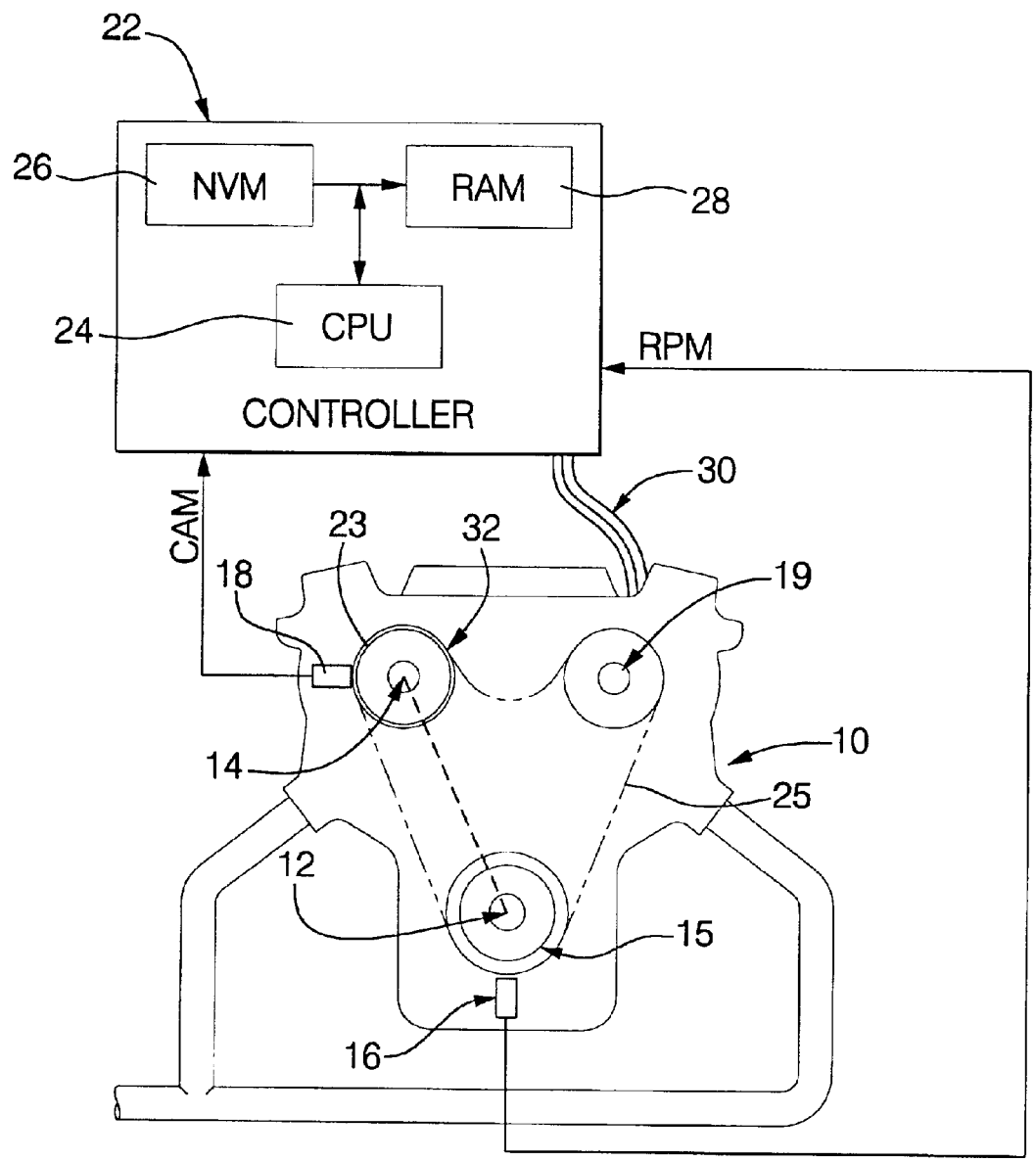
FIG. 1 is a diagrammatic drawing of the engine and crank sensing system of the present invention.
Figure 3:
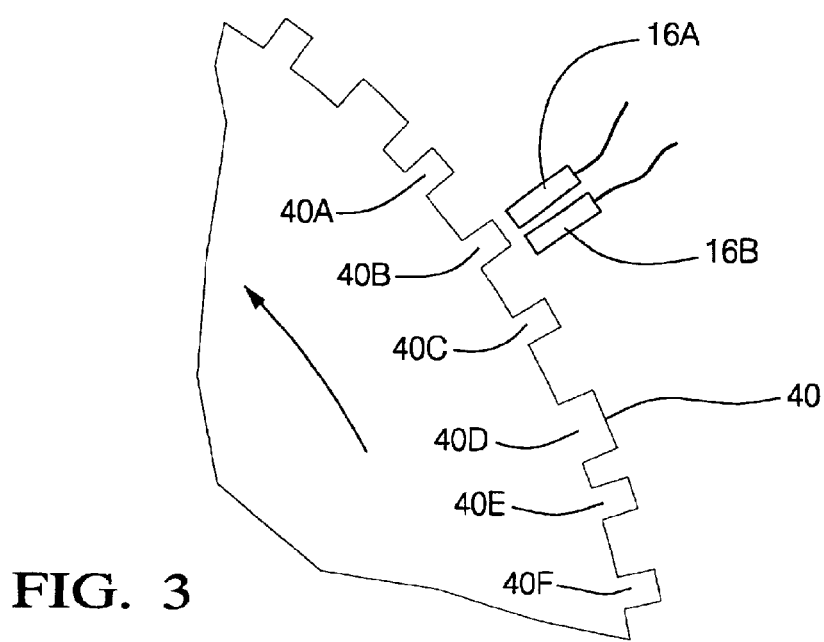
FIG. 3 is a diagram of a sensor layout and the target wheel of the present invention.

Referring to FIG. 1, an internal combustion engine 10 having a crankshaft 12 communicates in the form of periodic signals generated by the rotation of a target wheel 15 on the crankshaft 12 by a conventional wheel speed sensor 16. Referring to FIG. 3, alternate embodiments of the present invention may utilize two speed sensors 16a and 16b to generate the periodic signals. The target wheel 15 preferably has a 2.5 inch radial dimension measured at its outer circumference, but any functional radial dimension is considered within the scope of the present invention. The wheel speed sensor 16 may comprise any known wheel speed-sensing device including, but not limited to, variable reluctance sensors, Hall effect sensors, optical switches and proximity switches. The purpose of the wheel speed sensor 16 is to detect teeth, slots or tabs 40 on the target wheel 15 and provide a pulse train to an electronic controller 22. The electronic controller 22, in conjunction with other sensors, will determine the speed and position of the crankshaft 12 using the periodic signals generated by the speed sensor 16.

In one embodiment of the present invention, the internal combustion engine includes an intake manifold for providing air to the internal combustion engine; a throttle plate controlling the flow of the air; a fuel injector introducing fuel into the air to form an air fuel mixture; at learnt one piston for combusting the air fuel mixture; a plurality of valves to control intake and exhaust of the at least one piston; a first camshaft having a plurality of lobes to actuate the exhaust valves; a sprocket coupled to the first cam shaft to drive the first cam shaft; a crankshaft to drive the sprocket.

The electronic controller 22 may be any known microprocessor or controller used in the art of engine control. In the preferred embodiment, the controller 22 is a microprocessor, having nonvolatile memory (NVM) 26 such as ROM, EEPROM, or flash memory, random access memory (RAM) 28, and a central processing unit (CPU) 24. The CPU 24 executes a series of programs to read, condition, and store inputs from vehicle sensors. The controller 22 uses various sensor inputs to control the application of fuel and spark to each cylinder through conventional spark and fuel injector signals 30. The controller 22 further includes calibration constants and software stored in NVM 26 that may be applied to control numerous engine types.

In the preferred embodiment of the present invention, an inline six-cylinder engine is used with an exhaust camshaft 14 and an intake camshaft 19. The exhaust camshaft 14 and intake camshaft 19 are coupled to the crankshaft 12 via sprockets and a timing chain or belt 25. The exhaust camshaft 14 actuates exhaust valves for the cylinders, and the intake camshaft 19 actuates intake valves for the cylinders, as is commonly known in the art. A target wheel 23 coupled to the exhaust camshaft 14 generates periodic signals using wheel position sensor 18 to provide speed and position information for the exhaust camshaft 14. The target wheel 23 may be non-encoded or encoded and may be used in the place of target wheel 25 for crankshaft synchronization. The wheel position sensor 18 may be similar in functionality to wheel speed sensor 16.

The present invention may further be equipped with a continuously variable cam phaser 32, as is know in the art. The cam phaser 32 in the preferred embodiment may be coupled to the exhaust camshaft 14. In alternate embodiments of the present invention, a cam phaser 32 may be coupled to the intake camshaft 19 or to both the exhaust and intake camshafts 14, 19, depending on the desired performance and emission requirements of the ICE 10. The cam phaser 32 is hydraulically modulated to create a variable rotational offset between the exhaust camshaft 14 and the intake camshaft 19. The degrees of rotational offset generated by the cam phaser 32 enables the ICE 10 to be tuned for specific performance requirements by varying valve overlap, i.e., overlap between the exhaust and intake valves of the ICE 10. In applications where it is required that NOx components are reduced, the cam phaser 32 can provide charge dilution in the form of recirculated exhaust gases. Charge dilution is a method of adding an inert substance to the air/fuel mixture in a cylinder of the ICE 10. The inert substance will increase the heat capacity of the air/fuel mixture and reduce the amount of NOx components created during combustion. Thus, by regulating the valve overlap area, NOx components may also be regulated. Furthermore, engine performance characteristics such as horsepower and fuel economy may also be modified using the cam phaser 32.

Figure 2:
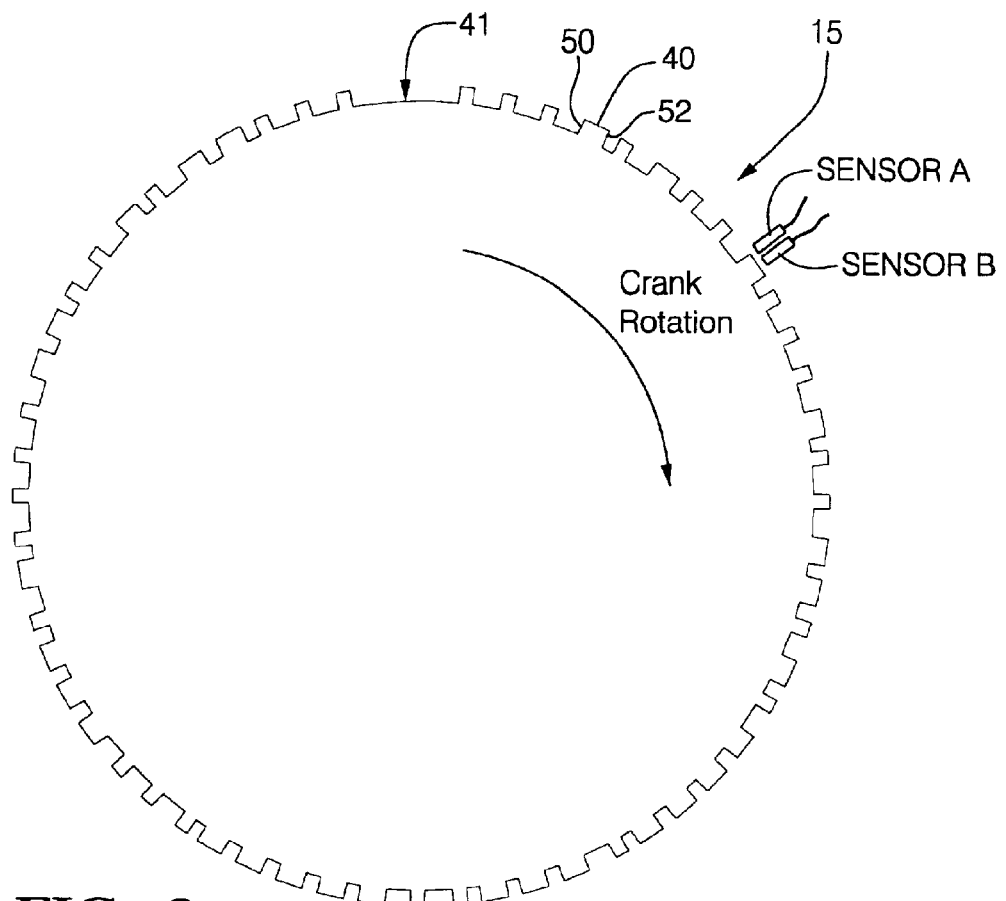
FIG. 2 is a diagrammatic drawing of the preferred embodiment of a target wheel used in the present invention.
Figure 4:
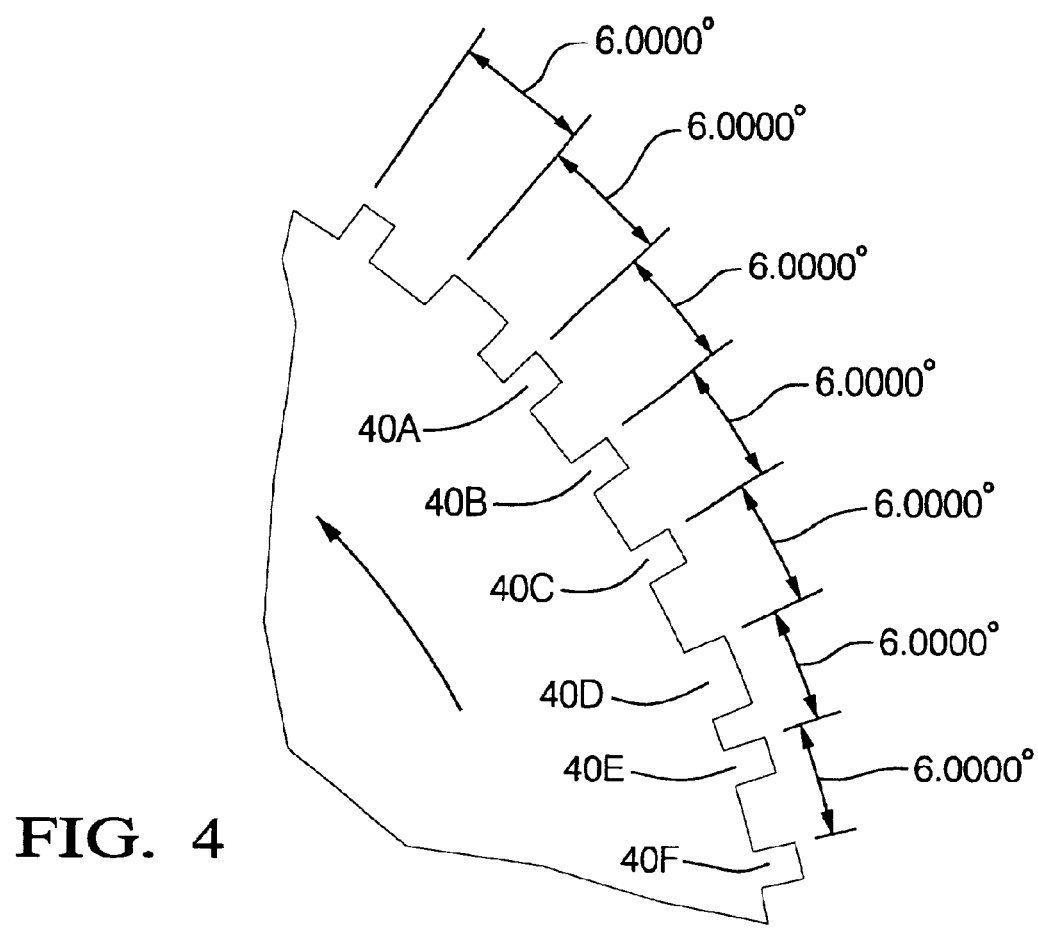
FIG. 4 is a diagram detailing the target wheel teeth of the present invention.

FIG. 2 is a diagram of the crankshaft 12 target wheel 15 of the preferred embodiment of the present invention that will be described in conjunction with FIGS. 3 and 4 and the timing diagram of FIG. 6. The target wheel 15 includes an irregular surface having the teeth, slots or tabs 40 and a synchronization region 41. The teeth 40 have rising edges 52 and falling edges 50 for generating a pulse train for wheel position sensor 16, and the synchronization region 41 corresponds to 12 rotational degrees. Detail of the teeth 40 is shown in FIGS. 3 and 4. Referring to FIG. 3, the dimensions of teeth 40a–40f are illustrated. Tooth 40a is a narrow tooth with dimensions of: 6 degree tooth period, 1.2 degrees high and 4.8 degrees low. Tooth 40b is a narrow tooth with dimensions of: 6 degree tooth period, 1.2 degrees high and 4.8 degrees low. Tooth 40c is a narrow tooth with dimensions of: 6 degree tooth period, 1.2 degrees high and 4.8 degrees low. Tooth 40d is a wide tooth with dimensions of: 6 degree tooth period, 4.8 degrees high and 1.2 degrees low. Tooth 40e is a narrow tooth with dimensions of: 6 degree tooth period, 1.2 degrees high and 4.8 degrees low. Tooth 40f is a narrow tooth with dimensions of: 6 degree tooth period, 1.2 degrees high and 4.8 degrees low. The use of six teeth 40a–40f forms a unique pattern that may be detected by the sensor within 36 degrees. The rising edges 52 correspond to the varying dimensions of the teeth 40 and are irregularly spaced. The falling edges 50 as shown in FIG. 4 are regularly spaced at six-degree intervals.

The regular spacing of the falling edges 50 enables the target wheel 15 of the present invention to be used with previous crankshaft timing systems relying on target wheels with regularly spaced falling edges and uniformly sized and spaced teeth in general. The irregular spacing of the rising edges 52 enables the target wheel 15 of the present invention to provide unique patterns within six teeth 40a–40f or approximately 36 degrees to quickly synchronize an ICE. Accordingly, the target wheel 15 of the present invention may be used across numerous old crankshaft timing systems and the crankshaft timing system of the present invention, leading to a reduction in inventory and cost savings.

Referring to FIG. 3, a dual crank sensor system is shown with the sensors 16a and 16b. The dual crank sensor system operates by identifying relatively wide and narrow switching regions generated by the tooth 40 configurations. The sensor 16a reaches the falling edge of the tooth and triggers the controller 22 to read the state of the sensor 16b. If sensor 16b has not reached the raised part of the tooth 40, a zero is registered in the pulse train to the controller 22; if the raised part is reached, a one is registered in the pulse trains. If one sensor 16 is used, the tooth 40 will be in the low state significantly longer than the high state, and can be reliably identified as a narrow tooth by comparing high time to low time. Similarly, for a wide tooth, the tooth 40 will be in the high state significantly longer than the low state. The single sensor method utilizes the same crank target wheel 15 as the dual sensor method. As with the dual sensor method, the two types of target wheel teeth have the following tooth geometry: A narrow tooth has a tooth period of 6 degrees, high region of 1.2 degrees and low region of 4.8 degrees. A wide tooth has a tooth period of 6 degrees, high region of 4.8 degrees and low region of 1.2 degrees.

The 58x encoded target wheel of the present invention can be synchronized using a number of methods. A conventional timing approach may be used by comparing the time between the active crank edges to find the synchronization region 41. This method looks for a short-long-short time relationship between subsequent active target wheel 15 edges to identify the synchronization region 41. The short-long-short relationship is specified by two calibrations, the CRANK_LONG_THRESHOLD calibration which specifies a mathematical relationship to identify the short-long part of the synchronization region and the CRANK_SHORT_THRESHOLD calibration which specifies a mathematical relationship between the long-short part of the synchronization region. When the following two conditions are met, the crank synchronization region has been identified:

$$\frac{\text{Period}(N-2)}{\text{Period}(N-1)} \le \text{CRANK\_LONG\_THRESHOLD}$$

$$\frac{\text{Period}(N)}{\text{Period}(N-1)} \le \text{CRANK\_SHORT\_THRESHOLD}$$

In the equations above, Period(N) is the time between the current active crank edge and the previous active crank edge, Period(N−1) is the time between the previous active crank edge and the preceding tooth, and Period(N−2) is the time between the two active crank edges preceding the previous active crank edge.

Figures 5, 7:
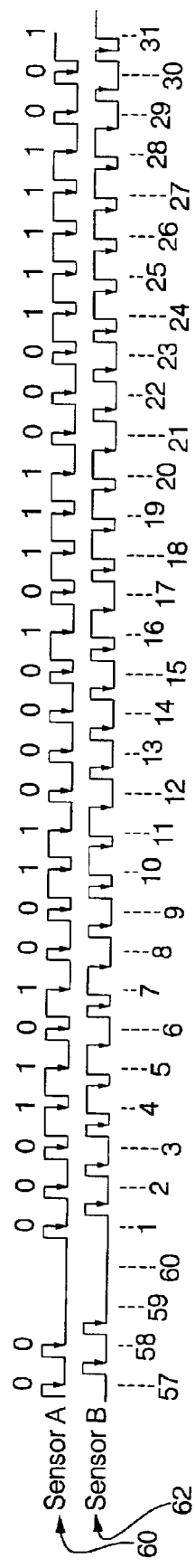
FIG. 5 is a lookup table giving the current crank position based on the last six crank states.
FIG. 7 is a timing diagram corresponding to FIG. 5.

Referring to FIG. 7, which shows a portion of the crankshaft target wheel 15 tooth pattern, there are two pulse trains shown that are generated as target wheel 15 rotates past sensors 16a and 16b. Pulse train 60 is generated by sensor 16a and pulse train 62 is generated by sensor 16b. In angle-based decoding, the signal provided by the active edge of the sensor 16a is used as a trigger for the controller 22 to sample the state of sensor 16b. The sampled states of sensor 16b are stored by the controller 22. If the current target wheel 15 tooth is a wide tooth sensor, sensor 16b will be high and a binary one will be recorded by the controller 22. If the current target wheel 15 tooth is a narrow tooth, sensor 16b will be low and a binary zero will be recorded by the controller 22. Once six crank states have been recorded, the position can be decoded by turning the binary pattern into an unsigned integer value and using the table in FIG. 5.

Figure 6:
FIG. 6 is a diagram illustrating the time low, time high, and tooth period for a narrow tooth which are used in time based decoding.

Referring to FIGS. 6 and 7, a single sensor, time-based decoding method for the target wheel 15 may be done with a single sensor 16. In the case of a single sensor 16 decode, only one pulse train 60 shown in FIG. 7 will be available to the controller 22. In time-based decoding, both the rising and falling edges E1, E2 and E3 of the teeth 40 are considered active. A tooth period is defined as the time between subsequent high to low crankshaft 12 transitions. Teeth 40 are decoded as follows: on each high to low transition, the controller calculates the time the signal was low to the time the signal was high over the tooth period. If the signal was low for 50 percent or more of the tooth period, the tooth is considered narrow. If the signal time is low for less than 50 percent of the period, the tooth is considered wide. Referring to FIG. 6, the tooth period is the time between edges E1 and E3, the time low is the time between edges E1 and E2, and the time high is the time between edges E2 and E3. If the current target wheel tooth is a wide tooth, a binary one will be recorded by the controller 22. If the current target wheel tooth is a narrow tooth, a binary zero will be recorded by the controller 22. Once six crank states have been recorded, the position can be decoded by turning the binary pattern into an unsigned integer value and using the table in FIG. 5.

Referring to FIG. 5, a table is shown which is used to decode crank position based on the type of the previous six crank teeth for the present invention. For example, the controller 22 decodes the following pattern: wide, narrow, narrow, wide, wide, wide. This translates to a binary pattern of 100111. The binary number 100111 translates to an unsigned integer value of 39. Looking in the table shown in FIG. 5, 39 translates into a current target wheel 15 of tooth 33. Knowing that the last tooth sampled was tooth 33, the exact angular position of the crank can be calculated by the controller 22.

While this invention has been described in terms of some specific embodiments, it will be appreciated that other forms can readily be adapted by one skilled in the art. Accordingly, the scope of this invention is to be considered limited only by the following claims.

What is claimed is:

1. A target wheel for providing timing information for a crankshaft in an internal combustion engine, the target wheel comprising a substantially circular member having a plurality of teeth, said teeth having variable widths, and said teeth having rising edges distributed in a non-uniform fashion and falling edges distributed in a uniform fashion, wherein said target wheel provides speed and timing information for multiple internal combustion engine configurations wherein said target wheel includes fifty-eight teeth and a synchronization pulse region.

2. The target wheel of claim 1 wherein said plurality of different internal combustion engine configurations is selected from the group comprising four cylinder engines, five cylinder engines, six cylinder engines, eight cylinder engines, ten cylinder engines and twelve cylinder engines.

3. A target wheel for providing timing information for a crankshaft in an internal combustion engine, the target wheel comprising a substantially circular member having a plurality of teeth, said teeth having variable widths, and said teeth having rising edges distributed in a non-uniform fashion and falling edges distributed in a uniform fashion, wherein said target wheel provides speed and timing information for multiple internal combustion engine configurations wherein said falling edges of said teeth are spaced at substantially six degrees apart.

4. A target wheel for providing timing information for a crankshaft in an internal combustion engine, the target wheel comprising a substantially circular member having a plurality of teeth, said teeth having variable widths, and said teeth having rising edges distributed in a non-uniform fashion and falling edges distributed in a uniform fashion, wherein said target wheel provides speed and timing information for multiple internal combustion engine configurations wherein at least six of said teeth create a pulse combination indicating the position of said target wheel.

5. A crankshaft system for use with en internal combustion engine in a vehicle comprising:
   a crankshaft coupled to a drive train of the vehicle;
   a sprocket coupled to said crankshaft to drive a cam shaft in the vehicle; and
   a target wheel coupled to said crankshaft, said target wheel having a plurality of teeth, said teeth having variable widths and rising edges and falling edges, said falling edges irregularly positioned on said target wheel, and said rising edges regularly positioned on said target wheel;

wherein at least six of said teeth create a pulse combination indicating the position of said target wheel; and whereby said target wheel provides process data for operation of a plurality of internal combustion engine configurations.

6. The crankshaft system of claim 5 further comprising a cam phaser coupling said camshaft to said sprocket.

7. The crankshaft system of claim 5 further comprising a sensor sensing said irregular surface to provide an electrical output.

8. The crankshaft system of claim 7 further comprising an electronic controller coupled to said sensor to interpret said electrical output to determine speed and position of said crankshaft.

9. The crankshaft system of claim 7 wherein said electrical output comprises a pulse string.

10. The crankshaft system of claim 9 wherein said electronic controller includes engine control software that is adaptable to said plurality of engine configurations by using selected pulses in said pulse string.

11. The camshaft system of claim 9 wherein said engine configurations are selected from the group comprising four cylinder engines, five cylinder engines, six cylinder engines, or eight cylinder engines.

12. An internal combustion engine comprising:

an intake manifold for providing air to the internal combustion engine;

a throttle plate controlling the flow of said air;

a fuel injector introducing fuel into said air to form an air fuel mixture;

at least one piston for combusting said air fuel mixture;

a plurality of valves to control intake and exhaust of said at least one piston;

a first camshaft having a plurality of lobes to actuate said exhaust valves;

a sprocket coupled to said first cam shaft to drive said first cam shaft;

a crankshaft to drive said sprocket; and a target wheel coupled to said crankshaft, said target wheel having a plurality of teeth, said teeth having variable widths and rising edges and falling edges, said falling edges irregularly positioned on said target wheel, and said rising edges uniformly positioned on said target wheel, wherein said target wheel is capable of providing process data for operation of a plurality of internal combustion engine configurations.

13. The internal combustion engine of claim 12 wherein the internal combustion engine is a four-cycle engine.

14. The internal combustion engine of claim 12 wherein the internal combustion engine is a direct injection engine.

15. The internal combustion engine of claim 12 wherein said target wheel includes fifty-eight teeth and a synchronization region.

16. The internal combustion engine of claim 15 wherein at least six of said fifty-eight teeth form a combination indicating the position of said target wheel, whereby engine synchronization may be determined from said at least six teeth.

17. The internal combustion engine of claim 12 further comprising a cam phaser coupled to said camshaft.

18. The internal combustion engine of claim 12 further comprising a sensor sensing said irregular surface to provide an electrical output.

19. The internal combustion engine of claim 12 further comprising an electronic controller coupled to said senior to interpret said electrical output to determine speed and position of said camshaft.

* * * * *